(12) United States Patent
Hongu

(10) Patent No.: US 8,520,129 B2
(45) Date of Patent: Aug. 27, 2013

(54) LENS CONTROL APPARATUS, OPTICAL APPARATUS, AND LENS CONTROL METHOD

(75) Inventor: Hideyasu Hongu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 12/652,662

(22) Filed: Jan. 5, 2010

(65) Prior Publication Data
US 2010/0171870 A1 Jul. 8, 2010

(30) Foreign Application Priority Data
Jan. 6, 2009 (JP) ................................ 2009-000836

(51) Int. Cl.
*H04N 5/232* (2006.01)
(52) U.S. Cl.
USPC ........................................................... 348/345
(58) Field of Classification Search
USPC ........................................................... 348/345
See application file for complete search history.

(56) References Cited

U.S. PATENT DOCUMENTS

| 5,005,956 | A |   | 4/1991  | Kaneda   |         |
|-----------|---|---|---------|----------|---------|
| 5,369,461 | A |   | 11/1994 | Hirasawa |         |
| 5,946,504 | A |   | 8/1999  | Hirasawa |         |
| 6,023,589 | A | * | 2/2000  | Ohta     | 396/80  |
| 7,471,330 | B2|   | 12/2008 | Okawara  |         |
| 7,911,525 | B2| * | 3/2011  | Ishikawa | 348/345 |
| 2003/0030920 | A1 | * | 2/2003 | Okawara | 359/823 |
| 2005/0078381 | A1 |   | 4/2005 | Okawara |         |
| 2005/0185083 | A1 |   | 8/2005 | Okawara |         |
| 2006/0181634 | A1 | * | 8/2006 | Onozawa | 348/345 |
| 2008/0187302 | A1 | * | 8/2008 | Okawara | 396/80  |
| 2008/0211957 | A1 | * | 9/2008 | Ishikawa | 348/345 |

FOREIGN PATENT DOCUMENTS

| EP | 0352778 B1    | 5/2000 |
|----|---------------|--------|
| EP | 1580984 B1    | 5/2009 |
| JP | 2795439 B2    | 9/1998 |
| JP | 2003-131121 A | 5/2003 |
| JP | 2005-121752 A | 5/2005 |
| JP | 2005-128107 A | 5/2005 |
| JP | 2005-234325 A | 9/2005 |
| JP | 2007-178577 A | 7/2007 |
| JP | 2007-219060 A | 8/2007 |

* cited by examiner

*Primary Examiner* — James Hannett
(74) *Attorney, Agent, or Firm* — Canon U.S.A., Inc. IP Division

(57) ABSTRACT

An imaging apparatus controls a movement of a second lens unit to compensate for an image-plane movement due to a movement of a first lens unit when a captured image is zoomed by moving the first lens unit, and controls the movement of the second lens unit to be performed within a range selected from data based on second information corresponding to an object distance. The data indicates a position of the first lens unit and a position of the second lens unit on an optical axis located behind the first lens unit, and is provided for each of object distances. The range of the movement of the second lens unit is changed according to a detection result by a second detection unit at a predetermined time.

10 Claims, 8 Drawing Sheets

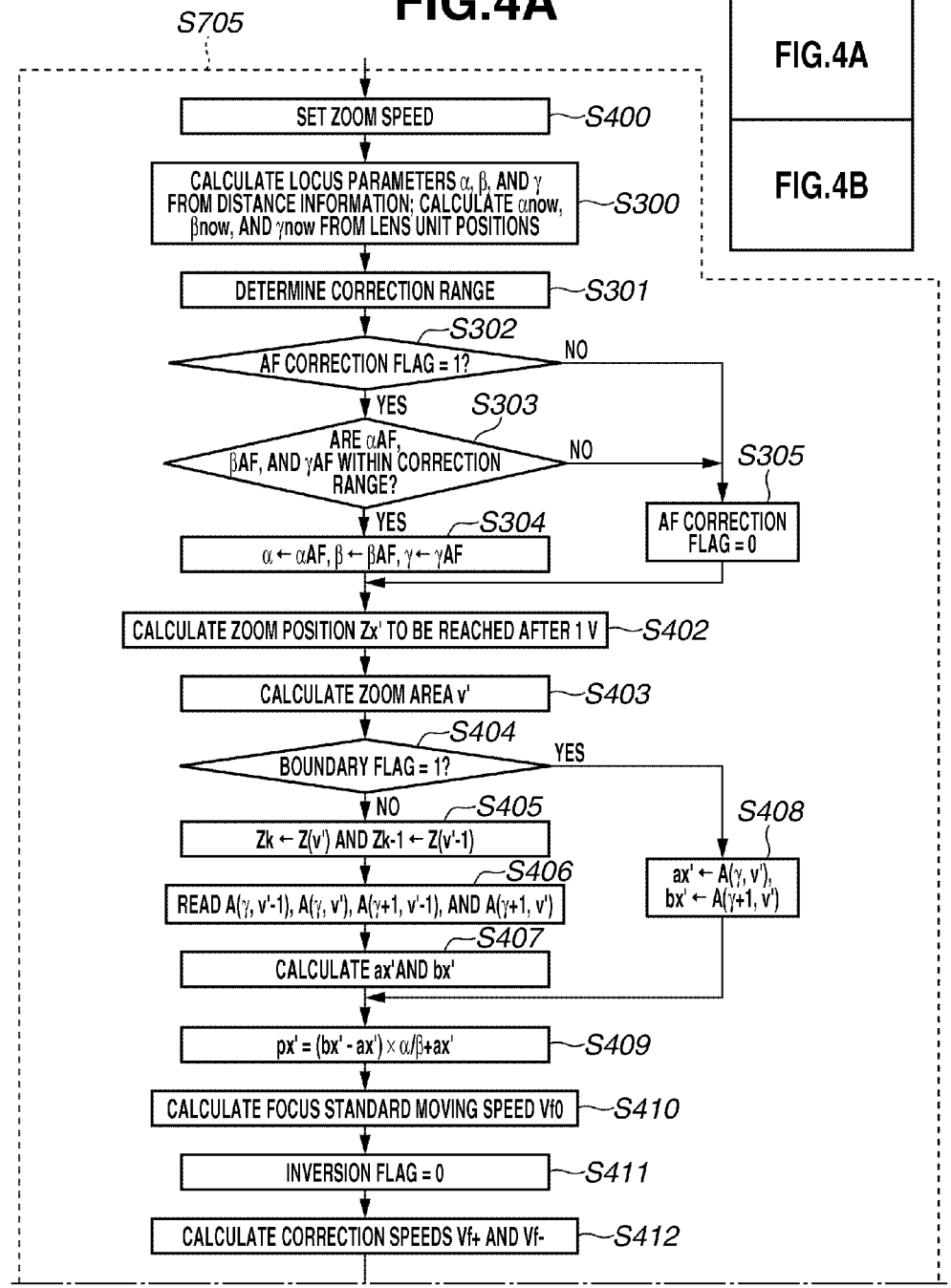

LENS CONTROL APPARATUS, OPTICAL APPARATUS, AND LENS CONTROL METHOD

BACKGROUND OF THE INVENTION

1. Field of the Invention

The present invention relates to lens control technology in an imaging apparatus, such as a camera.

2. Description of the Related Art

In a so-called inner focus type lens system, in which a focus lens unit is disposed on an optical axis behind a zoom lens unit, zooming is generally performed by tracing a locus selected from information about a plurality of loci (electronic cam loci) or information corresponding to the loci illustrated in FIG. 5, stored in memory. Information about a plurality of loci (electronic cam loci) or information corresponding to the loci shown in FIG. 5 may be information indicating the loci themselves or may be functions each having a variable corresponding to a lens position.

When the zoom lens unit is moved from a telephoto end to a wide-angle end, because a plurality of loci converge in a direction from a state that they are separated by some spaces from each other as illustrated in FIG. 5, an in-focus state can be maintained even if zooming is carried out by the above-described locus tracking method. However, when the zoom lens unit is moved from the wide-angle end toward the telephoto end, it is not certain which locus the focus lens unit, which has been at a convergent point, moves along, and the in-focus state cannot be maintained by a similar locus tracking method.

In a control method discussed in Japanese Patent No. 2795439, the movement of the focus lens unit is controlled by switching its direction to forcibly move away from the in-focus position and move in the direction of the in-focus position (the locus tracking speed is changed) when the zoom lens unit is moved (for zooming), by using an AF evaluation value signal (sharpness signal) obtained from high-frequency components of an image signal by a contrast method. In this manner, the tracking locus is corrected.

Moreover, Japanese Patent No. 275439 discusses a method for improving the accuracy of selection (specification) of the tracking locus by changing an increase-decrease cycle in the sharpness signal, which has been made possible by changing the variation of the tracking speed according to an object distance, a focal length, or a depth of field.

Japanese Patent Application Laid-Open No. 2005-234325 discusses an apparatus including an external distance metering unit.

However, information corresponding to a distance to a photographic object may sometimes include errors. This information including errors may increase the possibility of loss of consistency with information corresponding to loci as illustrated in FIG. 5.

SUMMARY OF THE INVENTION

According to an aspect of the present invention, an imaging apparatus includes a first detection unit configured to detect first information corresponding to the contrast of a captured image, a second detection unit configured to detect second information corresponding to an object distance, a memory arranged to store data about a position of a first lens unit and a position of a second lens unit located on an optical axis behind the first lens unit, the data being provided for each object distance, and a controller configured to control the movement of the second lens unit to compensate for an image-plane movement due to a movement of the first lens unit when the captured image is zoomed by moving the first lens unit, and to control the movement of the second lens unit to be performed within a range selected from the data based on the second information corresponding to an object distance, wherein the range of movement of the second lens unit is controlled in accordance with a detection result by the second detection unit at a predetermined time.

According to another aspect of the present invention, there is provided a method for controlling an imaging apparatus including a first detection unit configured to detect first information corresponding to a contrast of a captured image, a second detection unit configured to detect second information corresponding to an object distance based on an amount of image shift, a memory storing data about a position of a first lens unit and a position of a second lens unit located on an optical axis behind the first lens unit, the data being provided for each of object distances. The method includes controlling a movement of the second lens unit to compensate for an image-plane movement due to a movement of the first lens unit when the captured image is zoomed by moving the first lens unit, controlling the movement of the second lens unit to be performed within a range selected from the data based on the second information, and changing the range of the movement of the second lens unit according to a detection result by the second detection unit at a predetermined time.

According to an embodiment of the present invention, even if there are errors in the calculation of information corresponding to a distance to an object, blurring that would otherwise occur during zooming can be suppressed.

Further features and aspects of the present invention will become apparent from the following detailed description of embodiments with reference to the attached drawings.

BRIEF DESCRIPTION OF THE DRAWINGS

The accompanying drawings, which are incorporated in and constitute a part of the specification, illustrate embodiments, features, and aspects of the invention and, together with the description, serve to explain the principles of the invention.

DESCRIPTION OF THE EMBODIMENTS

Various embodiments, features, and aspects of the invention will be described in detail below with reference to the drawings.

A precursory technology according to an embodiment of the present invention is described in the following.

Figure 5:
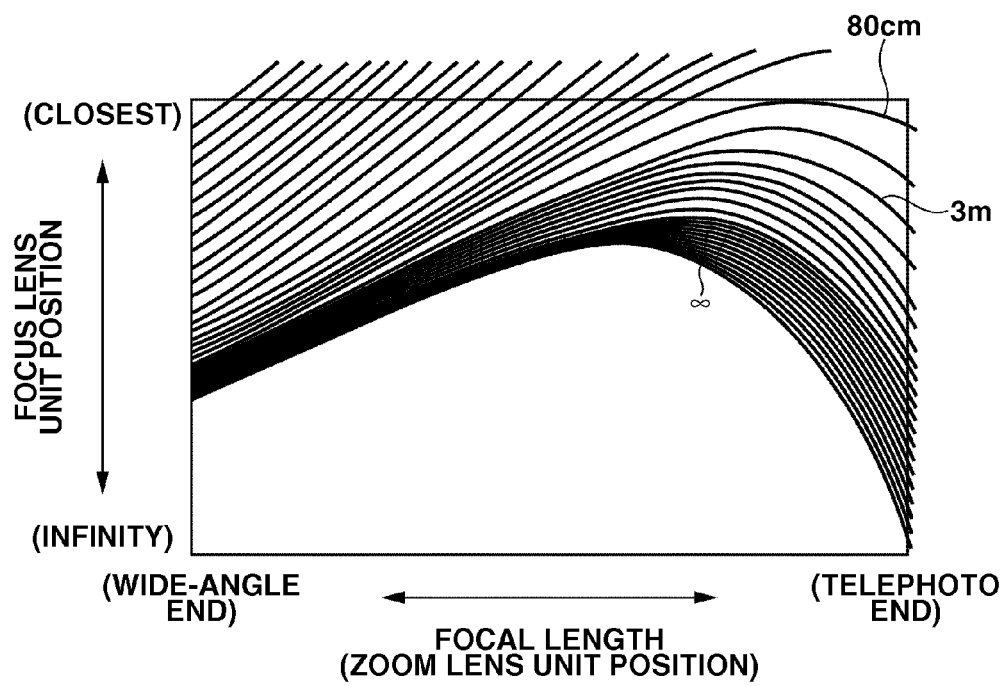
FIG. 5 is a conceptual diagram illustrating focusing loci according to object distances.

For example, a locus tracking method for a focus lens unit in an inner focus type lens system is discussed in FIG. 5 and in the description in Japanese Patent Application Laid-Open 2005-128107. An interpolation method in the moving direction of a zoom lens unit is discussed in FIG. 10 and in the description of Japanese Patent Application Laid-Open No. 2005-128107.

Moreover, an example of a table data of focusing locus information stored in a microcomputer is discussed in FIG. 11 and in the description of Japanese Patent Application Laid-Open No. 2005-128107.

Zooming control, which includes focus detection using an image signal from an image sensor, is generally performed in synchronization with a vertical sync signal for the image data.

Figure 1:
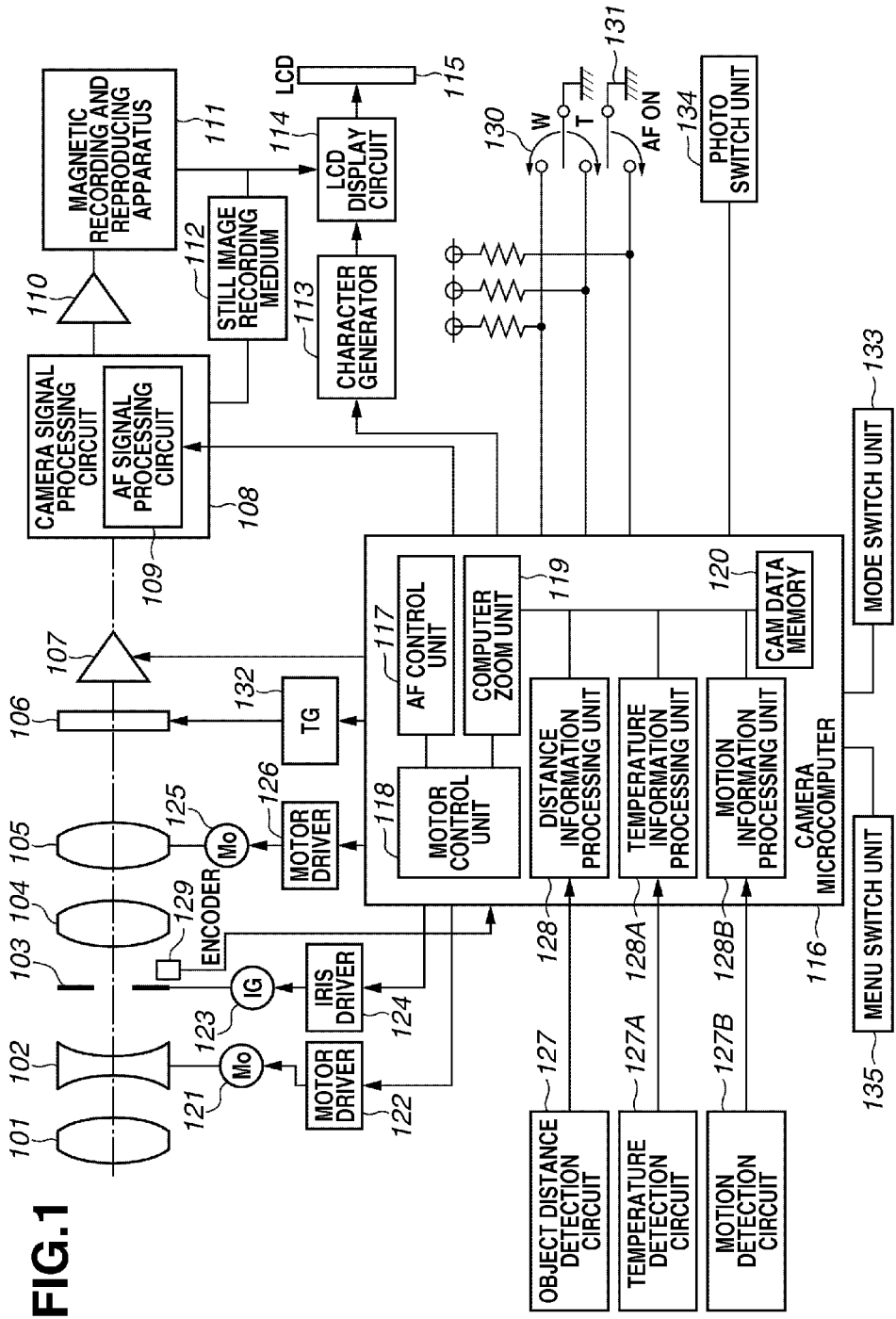
FIG. 1 is a block diagram illustrating a configuration of a video camera according to an embodiment of the present invention.

FIG. 1 illustrates a configuration of a video camera as an imaging apparatus (an optical apparatus), including a lens control apparatus according to a first embodiment of the present invention. In the present embodiment, an example in which the present invention is applied to an imaging apparatus integral with a photographic lens is described. In this respect, this embodiment can be applied to an interchangeable lens (optical apparatus) of an imaging system, which includes an interchangeable lens and a camera body. In this case, a microcomputer in a lens unit causes a zooming operation in response to a signal from the camera body. The present invention can be applied not only to a video camera but also to various types of imaging apparatuses, such as a digital still camera.

In FIG. 1, the video camera includes, in order from an object side, a fixed front lens unit 101, a zoom lens unit 102, which can be moved along the optical axis to change the magnification of an image, a diaphragm 103, a fixed lens unit 104, and a focus lens unit 105. The focus lens unit 105 serves as a focus adjusting function and also as a compensator function to compensate for a motion of the image plane caused by zooming. The focus lens unit 105 is located behind the zoom lens unit 102 on the optical axis and can move in the optical axis direction. In FIG. 1, a photographing optical system formed by those lens units is a rear focus optical system, including four lens units of positive, negative, positive, and positive optical power, in order from the object side (the left side of FIG. 1). Though each lens unit is drawn as if it were a single lens element, in fact, each lens unit may be formed of one lens element or a plurality of lens elements.

An image sensor 106 is configured of a CCD or a CMOS sensor. Rays of light from an object, passing through the photographing optical system, are focused on the image sensor 106. The image sensor 106 causes a focused object image to undergo photoelectric conversion and outputs an image signal. The image signal is amplified to an optimum level by an automatic gain controller 107 and then input to a camera signal processing circuit 108. The camera signal processing circuit 108 converts an input image signal into a standard television signal and outputs the signal to an amplifier 110. The television signal, amplified to an optimum level by the amplifier 110, is output to a magnetic recording and reproducing apparatus 111, where the television signal is recorded on a magnetic recording medium, such as magnetic tape. This recording medium may be other media, such as a semiconductor memory or an optical disk.

The television signal amplified by the amplifier 110 is sent also to an LCD display circuit 114 and displayed as a captured image on an LCD 115. In addition, images to inform the photographer of a shooting mode, a photographed condition, and a warning, among others, are displayed. Those images are displayed added with characters by a camera microcomputer 116, which controls a character generator 113 to superpose characters on the television signal in the LCD display circuit 114.

On the other hand, the image signal, which is concurrently input to the camera signal processing circuit 108, can be compressed by using an internal memory, and recorded on a still image recording medium 112, such as card media.

The image signal input to the camera signal processing circuit 108 is input also to an AF signal processing circuit 109. The AF signal processing circuit 109 detects first information corresponding to a contrast of the captured image. An AF evaluation value signal (focus signal) generated by the AF signal processing circuit 109 is supplied to the camera microcomputer 116.

The camera microcomputer 116 reads the states of a zoom switch 130 and an AF switch 131, and detects the state of a photo switch unit 134.

When the photo switch unit 134 is half pressed, an focusing operation by auto focusing is started, and when an in-focus state is attained, a focus lock is set. Then, when the photo switch unit 134 is fully pressed, a focus lock is set irrespective of an in-focus state or an out-of-focus state, and an image is stored in a memory (not shown) in the camera signal processing circuit 108, so that a still image is recorded on a magnetic tape or a still image recording medium 112.

The camera microcomputer 116 determines whether the camera is in a moving image shooting mode or in a still image shooting mode according to the state of a mode switch unit 133, and controls the magnetic recording and reproducing apparatus 111 and the still image recording medium 112 via the camera signal processing circuit 108. Thus, the camera microcomputer 116 supplies a television signal suitable to a type of recoding medium, and controls reproduction of a recorded television signal from the magnetic recording and reproducing apparatus 111 or the still image recording medium 112 when the mode switch unit 133 is set to the reproduction mode.

A computer zoom unit 119 in the camera microcomputer 116 outputs a signal to drive the zoom lens unit 102 in the telephoto direction or the wide-angle direction corresponding to a direction in which the zoom switch 130 is being operated. This signal is output when the AF switch 131 is off and the zoom switch 130 is being operated. Moreover, this signal is output to a zoom motor driver 122 by a program in the computer zoom unit 119. In response to this signal, the zoom motor driver 122 drives the zoom lens unit 102 in the above-described direction via a zoom motor 121. At this time, the computer zoom unit 119 drives a focus motor 125 via a focus motor driver 126, and drives the focus lens unit 106 to compensate for an image plane movement caused by zooming. A signal from the computer zoom unit 119 is based on lens cam data previously stored in a cam data memory 120 (representative locus data or locus parameter data corresponding to a plurality of object distances such as that illustrated in FIG. 5).

An AF control unit 117 in the camera microcomputer 116 is configured to perform a zooming operation while maintaining an in-focus state when the zoom switch 130 is being operated. Thus, the computer zoom unit 119, by using an internal program, drives the zoom lens unit 102 and the focus lens unit 105 according to lens cam data stored in the cam data memory 120, the first information from the AF signal processing circuit 109, and the second information from the object distance detection circuit 127. Further, the computer zoom unit 119 drives the zoom lens unit 102 and the focus lens unit 105 according to a temperature correction width from a temperature information processing unit 128A, and information regarding an operation condition of the lens control apparatus from a movement information processing unit 128B.

The object distance detection circuit 127 outputs second information corresponding to an object distance. An output signal from the object distance detecting circuit 127 is subjected to an arithmetic process in the distance information processing unit 128 in the camera microcomputer 116. The distance information processing unit 128 accumulates an output signal of the object distance detection circuit 127 for a predetermined time. This signal accumulation is performed to calculate a distance fluctuation range to be described below and to calculate information corresponding to reliability based on the calculated fluctuation range.

Then, object distance information, reliability information, and a distance fluctuation range are output to the computer zoom unit 119.

A temperature detection circuit 127A measures temperature and outputs a measurement result. Output of the temperature detection circuit 127A is subjected to an arithmetic process by the temperature information processing unit 128A in the camera microcomputer 116. The temperature information processing unit 128A calculates a temperature difference between a reference temperature, at which the position of the focus lens unit 105 coincides with an in-focus position in the object distance detection circuit 127, and a temperature output (current temperature) from the temperature detection circuit 127A. The temperature information processing unit 128A then obtains temperature correction widths Wlens and Wdist based on the calculated temperature difference.

Output of the temperature detection circuit 127A is output as temperature correction widths Wlens and Wdist to the computer zoom unit 119.

Output of the motion detection circuit 127B is subjected to an arithmetic process by the motion information processing unit 128B in the camera microcomputer 116, and is output as motion information to the computer zoom unit 119. The motion detection circuit 127B can be used as an angular velocity sensor or an acceleration sensor, and also can be applied to a method for extracting motion vectors in image processing.

If used as an angular velocity sensor, the motion detection information processing unit 128B serves to calculate an angular velocity ω from an output of the angular velocity sensor. This angular velocity ω is output as motion information to the computer zoom unit 119.

When the AF switch 131 is on and the zoom switch 130 is not being operated, the AF control unit 117 functions as follows. The AF control unit 117 outputs a signal to the focus motor driver 126 to drive the focus lens unit 105 to maximize an AF evaluation signal sent from the AF signal processing circuit 109. In response to an input signal, the focus motor driver 126 drives the focus lens unit 105 via the focus motor 125. In this manner, auto focus adjustment is performed.

The object distance detection circuit 127 outputs information corresponding to a distance to an object, obtainable by triangulation distance metering using an active sensor. As an active sensor in this case, an infrared sensor often adopted in compact cameras may be used.

In the present embodiment, a case where an object distance is detected by triangulation distance metering is described, but other methods can also be used. For example, it is possible to obtain information corresponding to an object distance by a TTL phase difference detection method. When the TTL phase difference detection method is used, an element (a half prism or a half mirror) is provided to split the light transmitted through an exit pupil of a photographic lens. Two images formed through the two areas of the exit pupil are guided to two line sensors. A correlation of outputs of the line sensors is determined, and a shift direction and a shift amount between the two outputs are detected. From detection results, information corresponding to a distance to the object is obtained.

The distance information processing unit 128 calculates information representing reliability. For example, in the case of the phase difference detection method, reliability can be obtained from a correlation value of the two images. Images with low contrast are more likely to include errors in calculation results of phase differences. Therefore, correlation values between two images are used as information representing the reliability of an object distance. When two images are shifted, if a peak correlation value between two images is higher than a predetermined value, this means that a distance detection result has a high reliability, or if the peak correlation value is lower than the predetermined value, the distance detection result has a lower reliability. When the phase difference detection method is used for AF, distance detection results with very low reliability are not to be used.

As a distance detection method, a method for detecting a distance to an object by measuring an ultrasonic propagation speed from a sensor may be adopted. In this case, reliability information, such as reflectance or attenuation rate, is used. Depending on the nature of the surface of an object, the reflectance of an ultrasonic wave is sometimes low and it may be difficult to measure it. However, by obtaining its reflectance, it is possible to confirm reliability of a detection result. This can be said of the attenuation rate pertaining to the object distance by ultrasonic waves.

The distance information from the object distance detection circuit 127 is sent to the distance information processing unit 128. The distance information processing unit 128 performs three types of processes as follows.

1. The current positions of the zoom lens unit 102 and the focus lens unit 105 are specified in such a way as what parts of the cam locus the lens units correspond to (refer to FIG. 8 in Japanese Patent Application Laid-Open No. 2005-128107, for example). As stated in step S401 in FIG. 4 of Japanese Patent Application Laid-Open No. 2005-128107, the distance information processing unit outputs distance information about the virtual cam loci, showing which object distance with a distance of how many meters an individual virtual cam locus, expressed by locus parameters $\alpha$, $\beta$, and $\gamma$, corresponds to, based on the current positions of the lens units. The locus parameters $\alpha$, $\beta$, and $\gamma$ and the object distances are transformed to each other by predetermined correlation table data, so that a real distance of a main object can be output.

2. The cam loci expressed by locus parameters $\alpha$, $\beta$, and $\gamma$ are obtained by performing inverse transformation of a correlation table mentioned in the process 1 on a real distance of an object from the object distance detection circuit 127. At this time, in the inverse transformation of the correlation table, data on the wide-angle side, where cam loci converge, is not used. Data on the telephoto side, where cam loci are dispersed, is used as much as possible, and locus parameters with the highest resolution can be obtained.

3. A real distance difference and a difference direction in the above processes 1 and 2 are calculated.

Out of the processes 1, 2, and 3, by the process 2, cam locus data corresponding to an object distance detected by the object distance detection circuit 127 is specified.

Meanwhile, the camera microcomputer 116 further performs exposure control. The camera microcomputer 116, by referring to a luminance level of a television signal generated by the camera signal processing circuit 108, controls an iris driver 124 to set a luminance level appropriate for exposure and drives an IG meter 123, and controls the aperture of the diaphragm 103. The aperture of the diaphragm 103 is detected by an iris encoder 129, so that feedback control of the diaphragm 103 is performed. If adequate exposure control cannot be implemented only by the diaphragm 103, an exposure time of the image sensor 106 is controlled by a timing generator (TG) 132 to perform a high shutter speed exposure up to a long-time exposure (slow shutter speed exposure). When exposure is insufficient as in photographing under low illuminance, the gain of a television signal is controlled via the automatic gain controller 107.

By operating a menu switch unit 135, the photographer can manually switch over to a shooting mode or a camera function suitable for the shooting conditions.

An algorithm used for zooming is described next. In the present embodiment, the computer zoom unit 119 executes a process of the following operation flow, including the above-described flows (programs).

In the present embodiment, according to the distance information obtained from the object distance detection circuit 127, the computer zoom unit 119 specifies (generates) a cam locus to trace, and performs zooming.

Figure 3:
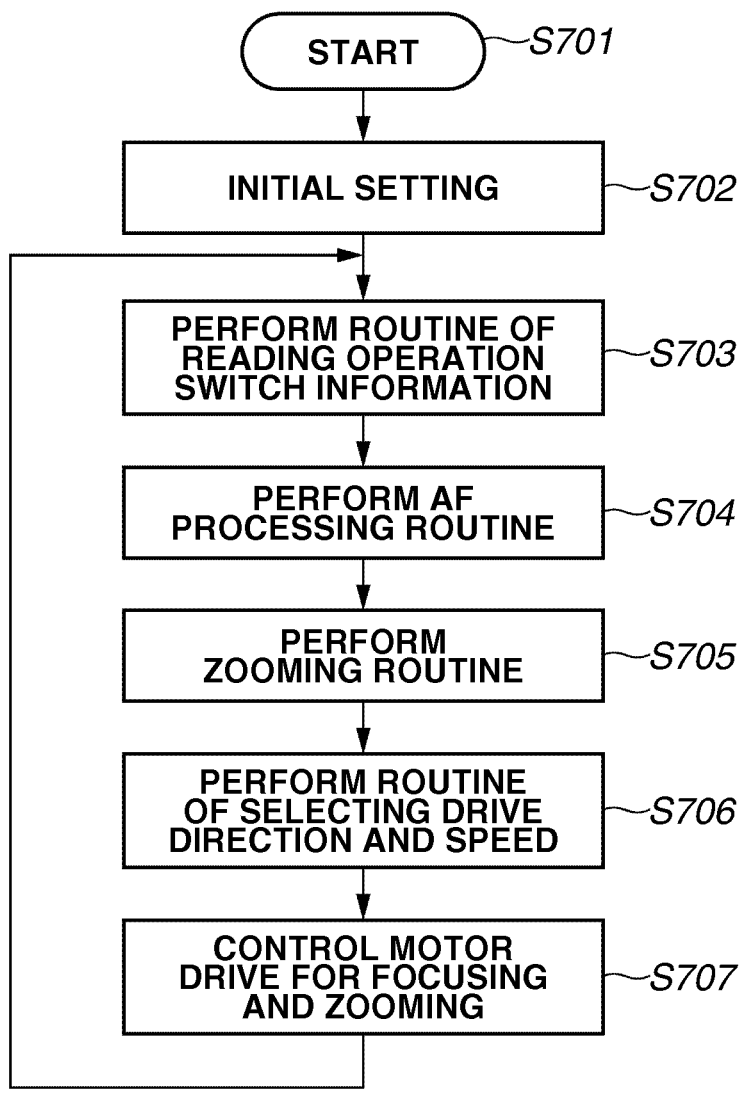
FIG. 3 is a flowchart illustrating operation steps in a video camera according to an embodiment of the present invention.

FIG. 3 is a flowchart illustrating an operation of the video camera according to an embodiment of the present invention. In step S701, the operation of the video camera is started. In step S702, the computer zoom unit 119 performs initialization. In step S703, the computer zoom unit 119 detects the state of the operation system of a camera body. The computer zoom unit 119 receives information about the zoom switch 130 operated by a photographer, and shows, on a display unit, zooming information, such as a position of the zoom lens unit 102 to inform the photographer that zooming is in progress. In step S704, the computer zoom unit 119 executes AF processing, that is, automatic focus adjustment processing according to changes in an AF evaluation signal. In step S705, the computer zoom unit 119 performs zooming processing. In step S706, when performing AF and zooming processing, the computer zoom unit 119 selects a drive direction and a speed so that the zoom lens unit 102 and the focus lens unit 105 may not hit against the ends of the camera mechanism based on calculation results of processing routines of steps S704 and S705.

In step S707, the computer zoom unit 119, based on information selected in step S706, outputs control signals to the motor drivers 122 and 126, and controls drive and stop of the lens units. At the end of processing in step S707, the process returns to step S703. A series of steps shown in FIG. 3 are executed in synchronism with a vertical sync signal. The compute zoom unit 119, during processing of step S703, waits until a next vertical sync signal is received).

Figure 4B:
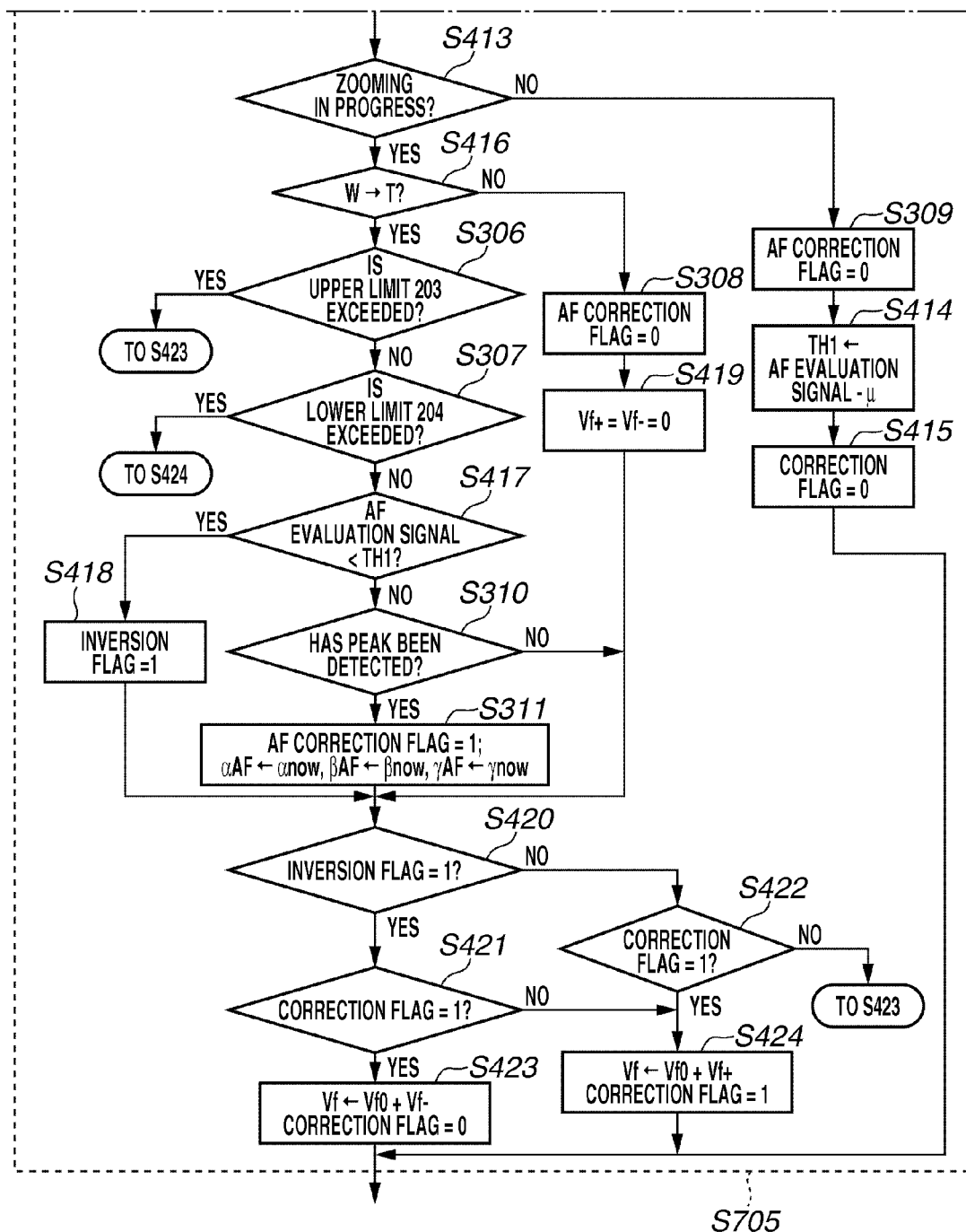
FIG. 4, composed of FIGS. 4A and 4B, is a flowchart illustrating a zoom process routine according to an embodiment of the present invention.

Next, FIG. 4 illustrates processing performed in step S705 in FIG. 3. Especially, this method is effective when the AF evaluation value detection periods become longer, as in ultra-high-speed zooming and, therefore, a sufficient accuracy cannot be secured in specifying zoom-tracking curves only by using reference signals (AF evaluation signal) in contrast detection.

FIG. 4 is a flowchart illustrating a zoom processing routine according to the present embodiment. Unless otherwise specified, the following processing is carried out by the computer zoom unit 119 in the camera microcomputer 116.

In step S400, the computer zoom unit 119 determines a zoom speed during zooming. In step S300, according to an output signal of the object distance detection circuit 127, the computer zoom unit 119 determines to which cam locus of the representative loci in FIG. 5 an object distance corresponds, and calculates locus parameters α, β, and γ. The computer zoom unit 119 further calculates locus parameters αnow, βnow, and γnow corresponding to the current positions of the zoom lens unit and the focus lens unit.

Locus parameters α, β, and γ based on information about an object distance obtained by the object distance detection circuit 127 are calculated by a method to be described below, for example.

To obtain a correlation between information corresponding to a distance to be output and a representative locus (cam locus) illustrated in FIG. 5, correlations between changes in distance and locus parameters are previously obtained in the form of table data in a range where the cam loci (cum curves) of representative object distances are uniform. Under this arrangement, by inputting information corresponding to a distance, locus parameters are calculated. For distances at which the cam locus pattern changes, if there is a lookup table showing other correlations, it will be helpful. By providing a plurality of lookup tables indicating other correlations, locus parameters become available to cover all object distances.

With regard to focal length, out of information about discrete cam loci in FIG. 5, stored as data in the memory, locus parameters can be output for a long focal length side where the resolution of locus parameters α, β, and γ is highest. Then, at a point in time that the zoom lens unit 102 is located on the wide-angle side, by performing an interpolation operation based on the locus parameters on the telephoto side, a single cam locus can be specified, which the focus lens unit 105 follows.

Step S300 is executed for each predetermined period (one vertical sync period, for example). Therefore, even if an object distance changes during zooming, the cam locus is updated to a newest form, which should be traced, successively according to an output of the object distance detection circuit 127.

In step S301, the computer zoom unit 119 determines a correction range of the cam locus based on an output of the object distance detection circuit 127 (namely, α, β, and γ calculated in step S300). This correction range is configured to define a moving range of the focus lens unit 105 during zooming. The correction range corresponds to a correction range during a correction operation of a tracking cam locus using a contrast signal (AF evaluation value). One example of the correction range is a range between the upper limit 201 and the lower limit 202 shown in FIG. 2 (the upper limit 203 and the lower limit 204 which are described below). Calculation of the correction range is described below with reference to FIG. 6.

In step S302, the computer zoom unit 119 determines whether an "AF correction flag" is in a set state. If the flag is set, the process advances to step S303. In step S303, the computer zoom unit 119 determines whether the locus parameters αAF, βAF, and γAF are included within the correction range (between the upper limit 203 and the lower limit 204) illustrated in FIG. 2. The locus parameters αAF, βAF, and γAF are locus parameters which are updated each time it is detected that the AF evaluation value 1303 has reached a level of the peak state 1301 in FIG. 7A. If those locus parameters are within the correction range, then in step S304, the computer zoom unit 119 sets the locus parameters αAF, βAF, and γAF to α, β, and γ, respectively, and the focus lens unit 105 is controlled to trace the cam locus specified again by the correction operation.

On the other hand, in step S303, if the locus parameters αAF, βAF, and γAF are outside of the correction range or in step S302, if the "AF correction flag" has been cleared, the computer zoom unit 119 keeps the locus parameters α, β, and γ. The locus parameters α, β, and γ are locus parameters specified based on information corresponding to a distance by the object distance detection circuit 127, which has been detected in step S300. The computer zoom unit 119 controls the focus lens unit 105 to trace a cam locus indentified by the locus parameters α, β, and γ.

The "AF correction flag" indicates whether the tracking cam locus has been re-specified according to a contrast signal, which will be described below. If the cam locus has been specified only according to information corresponding to a distance by the object distance detection circuit 127, then in step S305, the computer zoom unit 119 clears the "AF correction flag". Then, until the cam locus is re-specified by a correction operation next time or later, the computer zoom unit 119 performs locus trace control giving priority to a specification result that is based on information corresponding to the distance. Speaking of a case where a tracking cam locus is re-specified only by information corresponding to a distance by the object distance detection circuit 127, this case refers to a case where a tracking cam locus is not re-specified or a case where a cam locus which is to be re-specified is outside of the correction range shown in FIG. 2 and is most likely to be specified in the wrong.

In step S402, the computer zoom unit 119 calculates a position Zx' (a position at the destination of a movement from the current position) that the zoom lens unit 102 will have reached after the lapse of one vertical sync time. If a zoom speed determined in step S400 is designated as Zsp(pps), a zoom lens unit position Zx' after the lapse of one vertical sync time is given by equation (7), in which pps is the unit of a rotating speed of a stepping motor as the zoom motor 121, and means a rotation step amount per second (1 step=1 pulse). The sign of equation (7) depends on a moving direction of the zoom lens unit 102, that is, when it moves in the telephoto direction, the sign is positive (+) and when it moves in the wide-angle direction, the sign is negative (−).

$$Zx'=Zx\pm Zsp/\text{vertical sync frequency} \quad (7)$$

Next, in step S403, the computer zoom unit 119 determines in which area v' there is a zoom lens unit position Zx'.

Then, in step S404, the computer zoom unit 119 determines whether the zoom lens unit position Zx' is on the border of the zoom area after the lapse of one vertical sync time (1 V). If the border flag=0, it is determined that the zoom lens unit position is not on the border, and the computer zoom unit 119 proceeds to execute step S405 and so on. In step S405, the computer zoom unit 119 sets Z(v') for Zk and Z(v'−1) for Zk−1.

Next, in step S406, the computer zoom unit 119 reads four table data A(γ, v'−1), A(γ, v'), A(γ+1, v'−1), and A(γ+1, v'), in which an object distance is specified. In step S407, the computer zoom unit 119 calculates positions ax' and bx' of the focus lens unit.

On the other hand, if the determination in step S404 is Yes, then in step S408, the computer zoom unit 119 calls positions A(γ, v') and A(γ+1, v') with respect to the zoom area v' of the object distance γ, and stores them in memory as ax' and bx'. In step S409, the computer zoom unit 119 calculates an in-focus position px' of the focus lens unit 105 when the zoom lens unit position has reached Zx'. A target position of the focus lens unit 105 after the lapse of one vertical sync time is expressed in equation (8) shown below.

$$Px'=(bx'-ax')\times\alpha/\beta+ax' \quad (8)$$

Therefore, a difference between the target position and the current focus lens unit position is as follows:

$$\Delta F=(bx'-ax')\times\alpha/\beta+ax'-px$$

Then, in step S410, the computer zoom unit 119 calculates a focus standard moving speed Vf0. The speed Vf0 can be obtained by dividing the difference ΔF of the focus lens unit position by a movement time of the zoom lens unit 102 required to move this distance.

This process is finished, and the process advances to step S706 in FIG. 3. If zooming is in progress, the computer zoom unit 119 moves the focus lens unit 105 at a focus speed determined in step S410 in a direction of the sign of this focus speed (+ (positive) is the direction of the closest distance and − (negative) is the direction of infinity), and performs a compensator operation.

In step S411, the computer zoom unit 119 initialize various parameters. The computer zoom unit 119 also clears an "inversion flag" which is used in subsequent processes. In step S412, the computer zoom unit 119 calculates correction speeds Vf+ and Vf− for zigzag motion from the focus standard moving speed Vf0 obtained in step S410.

In step S413, the computer zoom unit 119 determines whether zooming is in progress according to information about the operating condition of the zoom switch 130, obtained in step S703 shown in FIG. 3. If a determination result is Yes, the computer zoom unit 119 performs steps from S416 on. If a determination result is No, then in step S309, the computer zoom unit 119 clears the "AF correction flag", and gets ready for an zooming operation in a direction from the wide-angle side to the telephoto side. In step S414, the computer zoom unit 119 determines a value obtained by subtracting an optional constant μ from a current value of the AF evaluation signal level to be TH1 (level 1302 in FIG. 7A), and also determines an AF evaluation signal level serving as a switching reference (to switch zigzag motions) of vectors in the correction direction described above.

In step S415, the computer zoom unit 119 clears the "correction flag" and exits this process. The "correction flag" is a flag configured to indicate whether the tracking state of the cam locus is in a state that correction in a positive direction is effective (the correction flag=1) or in a state that correction in a negative direction is effective (the correction flag=0).

If it is determined in step S413 that zooming is in progress, the computer zoom unit 119 determines in step S416 whether the zooming direction is in a direction from the wide-angle end to the telephoto end. If a result is No, like in step S309, then in step S308, the computer zoom unit 119 clears the "AF correction flag", and gets ready for a zooming operation in a direction from the wide-angle end to the telephoto end. Then, in step S419, the computer zoom unit 119 sets Vf+=0 and Vf−=0, and performs steps from step S420 on, but practically does not perform a zigzag drive.

Figure 2:
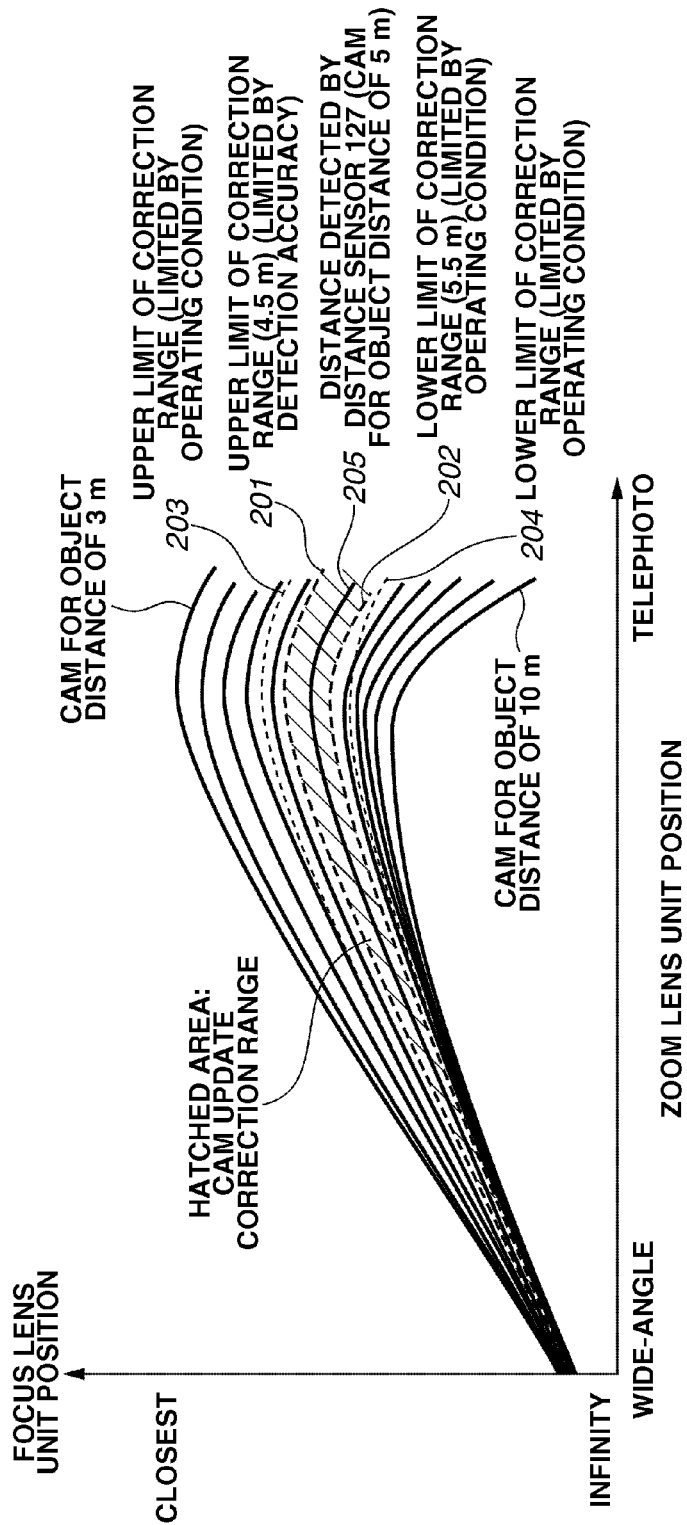
FIG. 2 is a conceptual diagram indicating a correction range in a correction operation of a cam locus according to an embodiment of the present invention.

In step S416, if a determination result is Yes, then in step S306, the computer zoom unit 119 determines whether the focus lens unit relative to the current zoom lens unit position is higher than the upper limit 203 of the correction range in FIG. 2. If the focus lens unit is higher, the computer zoom unit 119 advances to step S423 to bring the focus lens unit position back to a position in the correction range.

In step S423, the computer zoom unit 119 adds a negative correction speed Vf− to a calculated focus speed (standard moving speed) Vf0 (to correct the cam locus in a direction towards infinity). Consequently, the focus lens unit 105 is forcibly brought back in a direction towards the lower limit 204 from the upper limit 203.

If the focus lens unit 105 is not higher than the upper limit 203 in step S306, then in step S307, the computer zoom unit 119 determines whether the focus lens unit position relative to the current zoom lens unit position is lower than the lower limit 204 of the correction range in FIG. 2. If the focus lens unit position is lower than the lower limit, the computer zoom unit 119 proceeds to step S424 to bring the focus lens unit position back into the correction range. In step S424, the computer zoom unit 119 adds a positive correction speed Vf+ to a calculated focus speed (standard moving speed) Vf0 (to correct to the closest distance direction). Therefore, the focus lens unit 105 is forcibly brought back in a direction towards the upper limit 203 from the lower limit 204 of the correction range. Consequently, the drive range of the focus lens unit 105 is limited to within the correction range. As a result, the cam locus, which is re-specified by a zigzag motion, is limited to within the correction range.

In steps S306 and S307, if the focus lens unit position has not exceeded the correction range, then in step S417, the computer zoom unit 119 determines whether the current AF evaluation signal level is smaller than TH1, to enable a zigzag motion. If the determination is Yes, because this means that the current AF evaluation signal level is smaller than the level TH1 (1302) in FIG. 7A, then in step S418, the computer zoom unit 119 sets the inversion flag to switch the correction direction.

In step S420, the computer zoom unit 119 determines whether the inversion flag=1. If a result is Yes, the process advances to step S421, where the computer zoom unit 119 determines whether the correction flag=1. If a result is No in step S421, the process proceeds to step S424, where the computer zoom unit 119 sets 1 (correction in the positive direction) to the correction flag. Further, the computer zoom unit 119 sets the focus speed Vf as follows:

Focus speed $Vf=Vf0+Vf+$ (where $Vf+\geq 0$)

On the other hand, if a determination result is Yes in step S421, the process advances to step S423, where the computer zoom unit 119 sets 0 (correction in the negative direction) to the correction flag. Further, the computer zoom unit 119 sets the focus speed Vf as follows:

Focus aped $Vf=Vf0+Vf-$ (where $Vf-\leq 0$)

If a determination result is No in step S420, then in step S422, the computer zoom unit 119 determines whether the correction flag=1. If the result is Yes, the process advances to step S424, or if the result is No, the process proceeds to step S423.

After the process is finished, then in step S706 in FIG. 3, a drive direction and drive speed are selected for the focus lens unit 105 and the zoom lens unit 102 according to an operation mode.

When zooming is in progress, depending on whether the focus speed Vf obtained in step S423 or S424 is positive or negative, the computer zoom unit 119 sets the drive direction of the focus lens unit 105 in the closest distance direction or in the infinity direction. In this manner, the cam locus to be traced is re-specified while the focus lens unit 105 is driven in a zigzag pattern.

Figure 7A:
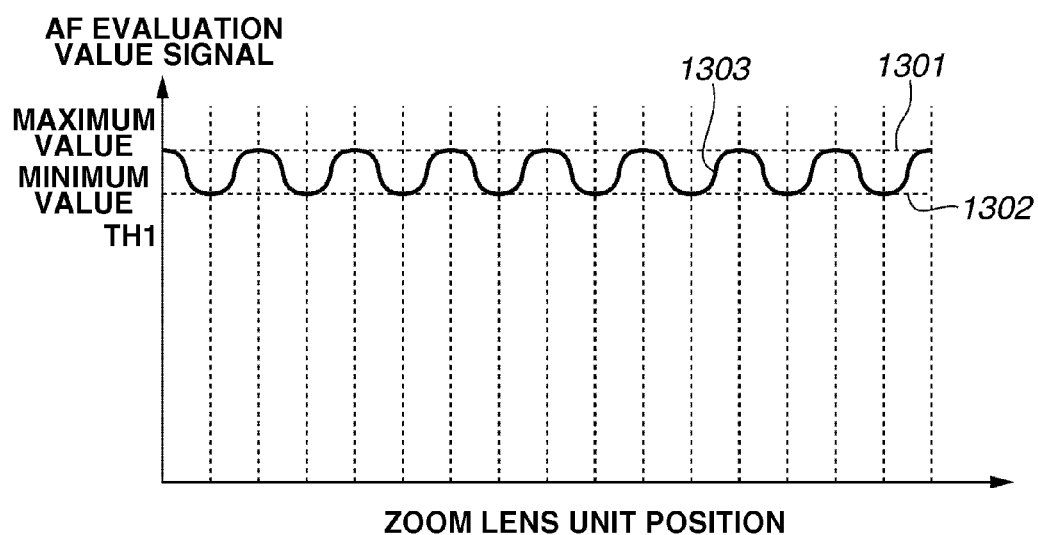
FIGS. 7A and 7B are conceptual diagrams illustrating a precursory technology according to an embodiment of the present invention.

While the zigzag motion continues, in steps S417 to S424, it is detected that the AF evaluation signal in contrast reaches the peak level 1301 shown in FIG. 7A. If a determination result is No in step S417, then in step S310, the computer zoom unit 119 determines whether the peak level 1301 is reached. When it is detected that the peak level is reached, then in step S311, the computer zoom unit 119 sets the AF correction flag=1 and also sets the current values of the locus parameters as re-specified locus parameters in contrast as follows:

αAF←αnow, βAF←βnow, γAF←γnow

If the conditions in steps S302 and S303 are satisfied when they are executed next time (if determination results in both steps are Yes, then in step S304, the computer zoom unit 119 updates the specified cam locus.

For the locus parameters updated and re-specified this time in step S304, depending on changes in information corresponding to a detected distance, in step S301, the correction range may be changed, the zooming operation is stopped, or the zooming direction is inverted. As a result, the cam locus is updated to a cam locus specified according to information corresponding to a distance.

If the conditions in step S302 or S303 are not satisfied next time, each time the AF evaluation signal is detected to reach a peak level anew (step S310), then in step S311, the computer zoom unit 119 updates the cam locus to an optimum locus when necessary during zooming by repeatedly updating the parameters αAF, βAF, and γAF.

In step S310, when the AF evaluation value signal has not been detected to reach the peak level, the process advances directly to step S420. The computer zoom unit 119 drives the focus lens unit 105 while correcting the cam locus in a correcting direction determined last time without switching over the correcting direction by a zigzag motion.

By the above-described processes, the computer zoom unit 119 defines a specific range (correction range) within which a cam locus to be traced using a contrast signal is specified according to information corresponding to a distance to an object. Therefore, the moving range of the focus lens unit is limited, contributing to a notable improvement of the accuracy of specifying a cam locus by using a contrast signal.

It becomes possible to inhibit occurrence of a problem of mistaking a wrong locus for a correct locus to be traced or a problem of malfunctioning in switching timing of the zigzag motion. Thus, the zoom speed can be made faster while preventing image blurring from occurring.

It is important to use a method in the present embodiment, in which a cam locus as a reference is previously specified in information corresponding to a distance, and the cam locus is corrected (re-specified) within a limited correction range by using a contrast signal. Therefore, it is possible to improve the correction accuracy of a tracking cam locus based on a contrast signal. Further, it becomes possible to decrease the detection accuracy of the object distance detection circuit 127 to some extent, and select a small-size less-expensive version of the object distance detection circuit 127.

Figure 6:
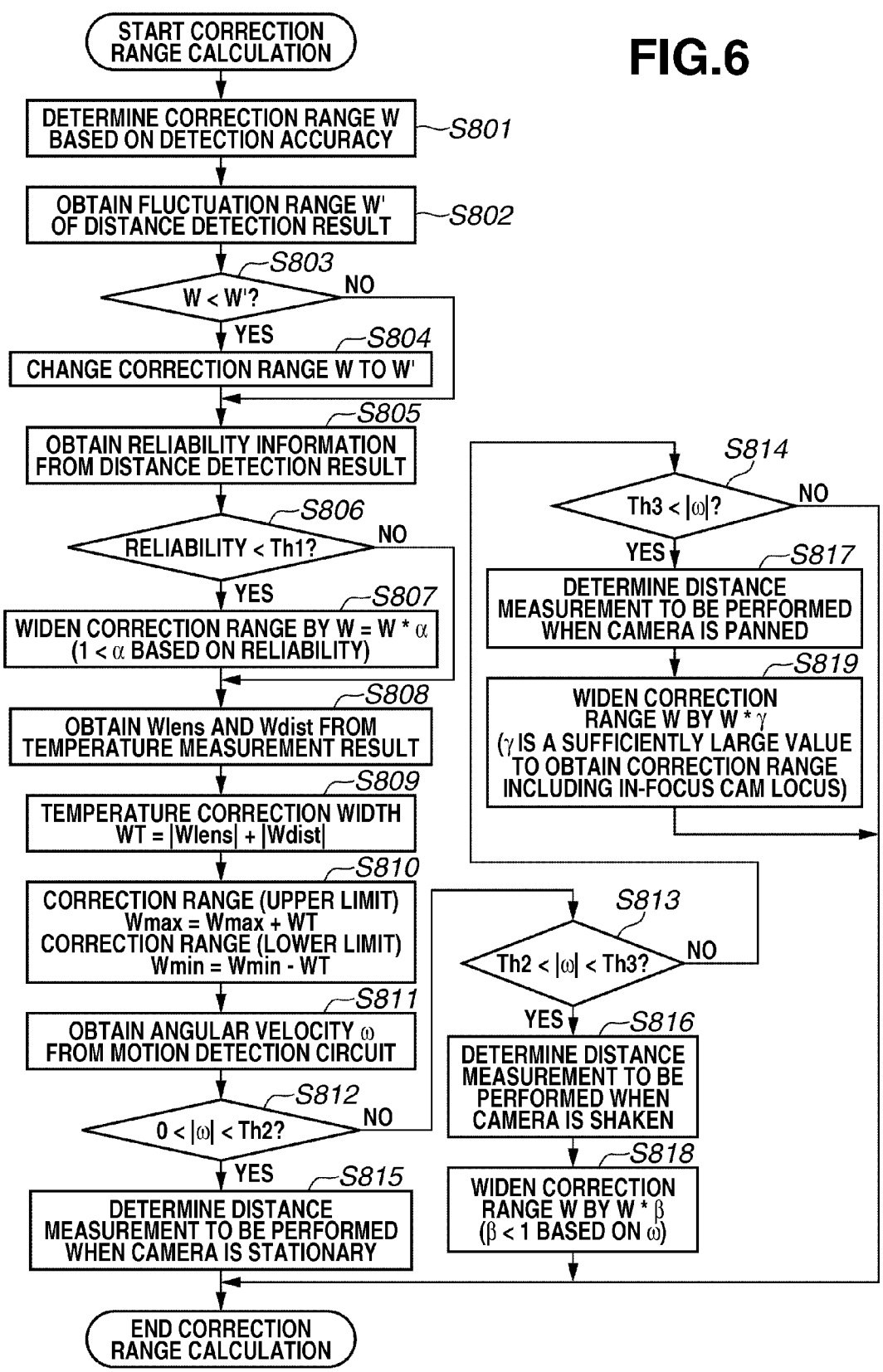
FIG. 6 is a flowchart illustrating a flow of determining a correction range according to an embodiment of the present invention.

Calculation of the above-described correction range is described below with reference to FIG. 6.

The correction range is determined in two stages as follows. The correction range is set to limit a re-specifying range when re-specifying a precise tracking cam locus by a correcting operation (zigzag motion) using a contrast signal.

If an output of the object distance detection circuit 127 corresponds to an object distance of 5 m (205 in FIG. 2), for example, the correction range is set to a range of ±50 cm of the object distance to limit a moving amount of the focus lens unit. In this case, the upper limit 201 corresponds to a cam locus for an object distance of 4.5 m, and the lower limit 202 corresponds to a cam locus for an object distance of 5.5 m. However, it sometimes happens that an output of the object distance detection circuit, affected by a motion of a camera, has a variation larger than detection accuracy of the detection circuit. In this respect, limits are imposed on the correction range by using sensor information for example, which is a feature of the present embodiment. FIG. 6 illustrates the flow of calculation of the correction range.

In step S801, the computer zoom unit 119 determines a correction range W based on detection accuracy. This is a predetermined range of ±50 cm for an object distance of 5 m as described above.

In step S802, the computer zoom unit 119 obtains a fluctuation range W' of distance detection results from an output of the distance information processing unit 128. For example, a fluctuation range W' is based on information corresponding to an object distance based on outputs of the distance information processing unit 128 for a predetermined time. If a distance detection result fluctuates between 4.25 m and 5.75 m, the fluctuation range W' will be a range between 4.25 m and 5.75 m.

In step S803, the computer zoom unit 119 compares the fluctuation range W' (between 4.25 m and 5.75 m) with the correction range W (between 4.5 m and 5.5 m). If the fluctuation range W' is wider than the correction range W, then in step S804, the computer zoom unit 119 updates the correction range W by the fluctuation range W'. In other words, the computer zoom unit 119 rewrites the correction range by W'.

Next, control of a correction range W according to reliability of an output of the object distance detection circuit 127 is described below. In step S805, the computer zoom unit 119 obtains information about the reliability via the distance information processing unit 128, which is output from the object distance detection circuit 127. The obtained reliability information is used to adjust the correction range W.

In step 806, if the reliability is lower than a given threshold value Th1, the process proceeds to step S807, where the computer zoom unit 119 performs a process to widen the correction range W. This is because the detection result is considered to contain an error. For example, the computer zoom unit 119 widens the range by multiplying the correction range W by a value $\alpha$, which is larger than 1 based on reliability.

For example, Th1 (a value indicating reliability is supposed to be between 0% and 100%) is here considered to be 90%. If the reliability is 95%, the correction range is not widened. This is because a cam to be traced is considered highly likely to be within the correction range.

On the other hand, if the reliability is less than 90%, because 90% is smaller than Th1, the correction range W is widened by multiplying it by $\alpha$. The value of $\alpha$ is set according to a magnitude of reliability. If the reliability is low, $\alpha$ is set at a larger value than when the reliability is high. This is because a cam to be traced is considered more likely to be outside of the correction range.

As described above, not only relying on a predetermined drive range according to detection accuracy of information corresponding to an object distance, but by limiting the correction range according to reliability of an output, it becomes possible to robustly deal with various types of objects and operating environments.

Control of the correction range W based on changes in temperature is described below.

Due to temperature changes, the zoom lens unit 102 and the focus lens unit 105 may change in characteristics, and the in-focus position of the focus lens unit 105 may be shifted. The object distance detection circuit 127 has its characteristics changed due to temperature changes. Therefore, it is useful to control the correction range W considering changes in characteristics with temperature.

In step S808, the computer zoom unit 119 obtains temperature error widths Wlens and Wdist calculated in the temperature information processing unit 128A and adjusts the correction range W. In step S809, the computer zoom unit 119 uses a temperature correction width WT, which is a sum of the two temperature error widths, and in step S810, the computer zoom unit 119 performs an arithmetic operation to widen both the lower limit value Wmin and the upper limit value Wmax by using the temperature correction width WT. By limiting the correction range W according to temperature, a cam locus to be traced can be included within the correction range.

Control of the correction range W by detecting a camera shake state and a panning state is described below.

The computer zoom unit 119 determines a camera shake state and a panning motion from detection results of the motion detection circuit 127B. In the present embodiment, a case where an angular speed sensor is used is described.

In steps S811 to S819, the computer zoom unit 119 determines a camera shake and a panning motion during distance metering according to an angular speed $\omega$ obtained from the motion detection information processing unit 128B. In steps S812 and S815, the computer zoom unit 119 determines that distance metering has been performed in a still state when the angular speed $\omega$ is 0 or larger and is smaller than a threshold value Th2. In this case, since it is considered that errors incident to a camera shake, for example, do not occur, the correction range is maintained without change.

In step S813, if the angular speed $\omega$ is larger than Th2 and smaller than Th3, then in step S816, the computer zoom unit 119 determines that distance metering is performed in a camera shake state. When it is determined that the camera is shaken, a change appears in a signal obtained by the object distance detection circuit 127. If the object distance detection circuit 127 is of a phase difference type, effects of a camera shake appear in the form of a decrease in contrast of an image signal when a luminance signal is obtained. In a calculation result of correlation based on this signal, even if a correlation value is high, the value is not reliable. Even when the reliability is high in distance metering, in which a camera shake occurs, in step S818, to expand the correction range, the limitation on the correction is expanded by multiplying the correction range by $\beta$ with a value of larger than 1 based on the angular speed $\omega$.

In step S814, if the angular speed $\omega$ is larger than a threshold value Th3, then in step S817, the computer zoom unit 119 determines distance metering is performed during panning. Because the object is likely to change before and after a panning motion, if the correction range effective before the motion is applied to the object after the motion, a correction range not applicable to an object distance may be applied. Therefore, in step S819, the computer zoom unit 119 expands the limitation on the correction range by multiplying the correction range W by $\gamma$ with a sufficiently large value to realize a correction range including a cam locus to be traced.

By the above-described process, eventually, the correction range W becomes a range placed between the upper limit 203 and the lower limit 204 as shown in FIG. 2.

As has been described above, in the present embodiment, the limitation on the correction range is defined based not only on output of the object distance detection circuit 127 but also on information obtained from the temperature detection circuit 127A and the motion detection circuit 127B.

By taking into consideration information obtainable from the above detection circuits, it become possible to deal with various objects and changes in objects. Further, it is possible to robustly cope with changes in the operational environment. Therefore, it is possible to apply a limitation to keep cam loci to be traced stay within the correction range, and to inhibit occurrence of image blurring during zooming.

By re-specifying a precise tracking cam locus by a correcting operation (zigzag motion) using a contrast signal within a correction range, the detection resolution (accuracy) of the object distance detection circuit 127 need not be set at so high a level. A resulting advantage is to be able to provide a low-priced small-size imaging apparatus. The number of switching times of the zigzag motion can be increased. Moreover, the frequency of continuously correcting the cam locus in the same correcting direction can be reduced. Therefore, it is possible to prevent blurring, which includes periodic recurrence of the in-focus state and slight blurring of images in accordance with the zigzag motion. Moreover, it is possible to inhibit image blurring which occurs when a wrong locus is traced or at recovery to a correct locus.

As described above, a correcting operation (zigzag motion) of a tracking cam locus using a contrast signal is carried out within a correction range based on the upper limit 203 and the lower limit 204, and when this range is going to be exceeded, the drive direction of the focus lens unit 105 is reversed. As a result, re-specification of the cam locus outside of the correction range is prevented.

In the present embodiment, the correction range is set according to the detection resolution of the object distance detection circuit 127 and according to information from the temperature detection circuit 127A and the motion detection circuit 127B. Only in this range, it is permitted to specify a precise tracking cam locus by a contrast signal. Under this arrangement, induction of malfunctioning and image blurring is suppressed which is caused by simultaneous use of a contrast signal.

Re-specification of a tracking cam locus is permitted only when specification results coincide with each other between one method of specifying a cam locus based on an output of the object distance detection circuit 127 and the other method of specifying a cam locus based on a detection signal of the in-focus state by a contrast signal. Therefore, it is possible to realize a cam tracking method with extremely high precision formed by a combination of advantages of different specification methods.

To specify a tracking locus using a contrast signal described in the discussion of precursory technology, it has been necessary to set the drive speed (correction speed) of the focus lens unit for the zigzag motion at speeds to cover from the cam loci on the infinity side to the cam loci on the closest distance side. In contrast, in the present embodiment, by setting limitations to the correction range of the cam loci, the drive range can be narrowed even if the correction speed of the focus lens unit is the same as in the precursory technology. Therefore, the number of times of the zigzag motion per unit time can be increased, starting with the number of times of the first zigzag motion. Therefore, even in high-speed zooming, the accuracy of cam locus specification by a contrast signal can be improved.

On the other hand, when the number of times of the zigzag motion is not increased, starting with the number of times of the first zigzag motion, the set value of the correction speed can be reduced. Blurring can be suppressed, which includes periodic recurrence of the in-focus state and slight blurring in the correcting motion when a high-frequency object is photographed (detail will be described in a second embodiment below). Therefore, it is possible to provide a zooming system with a high degree of freedom, which makes best use of the zoom performance by employing an optimum control method according to specifications for an imaging apparatus which is supplied, giving priority to zoom speed or visibility, for example, even when the method adopted remains the same.

In the first embodiment, a case has been discussed where a correction speed in a correction operation of the focus lens unit 105 by a contrast signal is the same as the speed in the precursory technology discussed in FIG. 3. In the first embodiment, the correction range is limited, so that the moving (drive) distance of the focus lens unit 105 is reduced. The zooming system is provided with a high capability in specifying a tracking cam locus even during high-speed zooming.

On the other hand, in a second embodiment, the correcting speed is set slower than in the first embodiment. Therefore, periodic image blurring, in which an image blurs and comes into focus alternately according to the zigzag motion, can be reduced.

Figure 7B:
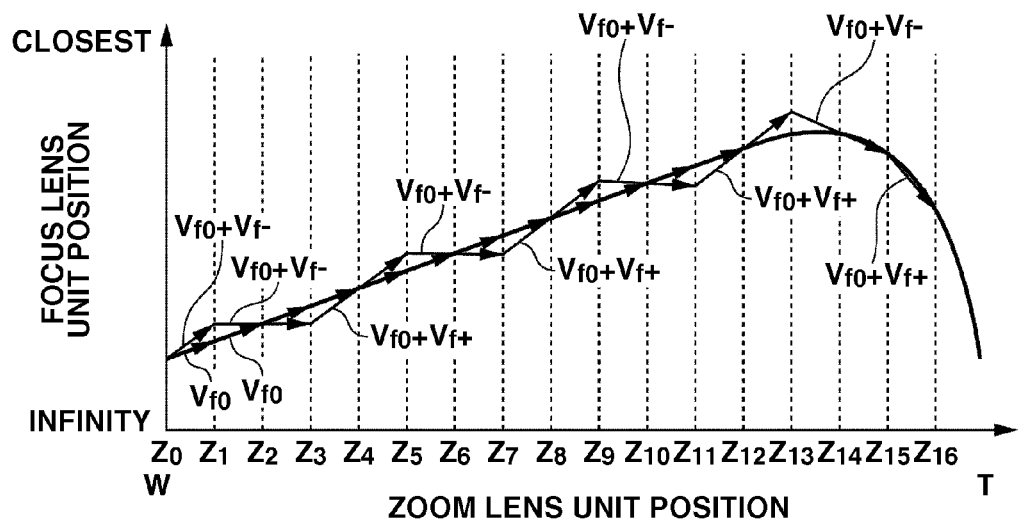

For example, when the correction speed is set at ½ of the speed in the first embodiment, overshoot is reduced which occurs at inversion timing of the drive direction of the focus lens unit 105 as illustrated in FIG. 7B. The drive direction inversion timing of the focus lens unit 105 is timing when the AF evaluation signal falls below the level 1302. Since an overshoot amount is reduced, periodic changes to the eye, such as image blurring or coming into focus, can be decreased.

To reduce the correction speed to ½, for example, it is only necessary to add a process of setting correction speeds Vf+ and Vf−, calculated in step S412 in FIG. 4, to ½. Coefficients are supplied to equations (4) and (5) and the following equations are calculated.

$$\text{Focus speed } Vf = Vf0 + Vf+/2 \text{ (where } Vf+ \geq 0\text{)} \tag{4}'$$

$$\text{Focus speed } Vf = Vf0 + Vf-/2 \text{ (where } Vf- \leq 0\text{)} \tag{5}'$$

In the above-described embodiments, a case has been discussed where when a cam locus (α, β, γ) to be traced is specified (generated) based on information corresponding to a distance to an object, a range for the specification is limited. In this respect, the technical concept described above can be applied to when the range is limited based on information corresponding to a distance to an object when a target position of the focus lens unit is calculated (generated).

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to embodiments, it is to be understood that the invention is not limited to the disclosed embodiments.

This application claims priority from Japanese Patent Application No. 2009-000836 filed Jan. 6, 2009, which is hereby incorporated by reference herein in its entirety.

What is claimed is:
1. An imaging apparatus comprising:
first detection means configured to detect first information corresponding to a contrast of a captured image;
second detection means configured to detect second information corresponding to an object distance;
third detection means configured to detect third information as motion information corresponding to an angular velocity;
a memory arranged to store data about a position of a first lens unit and a position of a second lens unit located on an optical axis behind the first lens unit, the data being provided for each object distance; and
a controller configured to control a movement of the second lens unit to compensate for an image-plane move- ment due to a movement of the first lens unit when the captured image is zoomed by moving the first lens unit, wherein the controller controls the movement of the second lens unit based on the first information, and wherein the controller controls the movement of the second lens unit to be performed within a range selected from the data based on the second information corresponding to an object distance and the third information.

2. The imaging apparatus according to claim 1, wherein the range of the movement of the second lens unit changes according to at least one of a camera shake state or a panning state.

3. The imaging apparatus according to claim 1, wherein a detection result by the second detection means is obtained according to a phase difference detection method, and
wherein the controller is configured to change the range of the movement of the second lens unit according to a peak correlation value between two images detected by the second detection means.

4. The imaging apparatus according to claim 2, wherein a detection result by the second detection means is obtained according to a phase difference detection method, and
wherein the controller is configured to change the range of the movement of the second lens unit according to a peak correlation value between two images detected by the second detection means.

5. The imaging apparatus according to claim 1, further comprising a thermometer arranged to measure ambient temperature,
wherein the controller is configured to change the range of the movement of the second lens unit according to said ambient temperature measurement.

6. A method for controlling an imaging apparatus including first detection means configured to detect first information corresponding to a contrast of a captured image, second detection means configured to detect second information corresponding to an object distance based on an amount of image shift, third detection means configured to detect third information as motion information corresponding to an angular velocity, a memory storing data about a position of a first lens unit and a position of a second lens unit located on an optical axis behind the first lens unit, the data being provided for each of object distances, the method comprising:
controlling a movement of the second lens unit to compensate for an image-plane movement due to a movement of the first lens unit when the captured image is zoomed by moving the first lens unit, wherein the controlling the movement of the second lens unit is based on the first information; and
controlling the movement of the second lens unit to be performed within a range selected from the data based on the second information and the third information.

7. The method according to claim 6, wherein the range of the movement of the second lens unit changes according to at least one of a camera shake state or a panning state.

8. The method according to claim 6, wherein a detection result by the second detection means is obtained according to a phase difference detection method, and
wherein the controlling includes changing the range of the movement of the second lens unit according to a peak correlation value between two images detected by the second detection means.

9. The method according to claim 7, wherein a detection result by the second detection means is obtained according to a phase difference detection method, and
wherein the controlling includes changing the range of the movement of the second lens unit according to a peak correlation value between two images detected by the second detection means.

10. The method according to claim 6, further comprising measuring ambient temperature,
wherein the controlling includes to changing the range of the movement of the second lens unit according to said ambient temperature measurement.

* * * * *